(12) United States Patent
Okita (10) Patent No.: US 8,079,812 B2
(45) Date of Patent: Dec. 20, 2011

(54) TURBINE COMPONENT

(75) Inventor: Yoji Okita, Tokyo (JP)

(73) Assignee: IHI Corporation, Tokyo (JP)

( * ) Notice: Subject to any disclaimer, the term of this patent is extended or adjusted under 35 U.S.C. 154(b) by 894 days.

(21) Appl. No.: 12/092,195

(22) PCT Filed: Nov. 1, 2005

(86) PCT No.: PCT/JP2005/020080
§ 371 (c)(1),
(2), (4) Date: Apr. 30, 2008

(87) PCT Pub. No.: WO2007/052337
PCT Pub. Date: May 10, 2007

(65) Prior Publication Data
US 2008/0286090 A1    Nov. 20, 2008

(51) Int. Cl.
*F01D 5/18*    (2006.01)
(52) U.S. Cl. ............................................ 416/97 R
(58) Field of Classification Search ............ 416/97 R
See application file for complete search history.

(56) References Cited

U.S. PATENT DOCUMENTS

| 4,529,358 | A | | 7/1985 | Papell | |
|---|---|---|---|---|---|
| 4,684,323 | A | * | 8/1987 | Field | 416/97 R |
| 4,705,455 | A | * | 11/1987 | Sahm et al. | 416/97 R |
| 6,234,755 | B1 | * | 5/2001 | Bunker et al. | 416/97 R |
| 6,383,602 | B1 | * | 5/2002 | Fric et al. | 416/97 R |
| 6,817,833 | B2 | * | 11/2004 | Haselbach | 416/97 R |
| 6,979,176 | B2 | | 12/2005 | Nakamata et al. | |
| 2004/0265488 | A1 | * | 12/2004 | Hardwicke et al. | 427/180 |
| 2005/0286998 | A1 | * | 12/2005 | Lee et al. | 415/117 |

FOREIGN PATENT DOCUMENTS

| GB | 2 389 330 A | 12/2003 |
|---|---|---|
| JP | 60-216022 | 10/1985 |
| JP | 7-63002 | 3/1995 |
| JP | 7-332005 | 12/1995 |
| JP | 10-89005 | 4/1998 |
| JP | 2000-141069 | 5/2000 |
| JP | 2000 230402 | 8/2000 |
| JP | 2001-12204 | 1/2001 |
| JP | 2005 180339 | 7/2005 |
| JP | 2006-9785 | 1/2006 |

\* cited by examiner

*Primary Examiner* — Richard Edgar
(74) *Attorney, Agent, or Firm* — Oblon, Spivak, McClelland, Maier & Neustadt, L.L.P.

(57) ABSTRACT

A plurality of film cooling holes 13 is formed at regions exposed to a hot gas in a turbine component main body 3, each of the film cooling holes 13 is comprised of a straight hole portion 15 formed at a portion at a side of an inner wall surface 5a of the turbine component main body 3 and a diverging hole portion 17 formed at a portion at a side of an outer wall surface 5b of the turbine component main body 3, and further each of the film cooling holes 13 is so constituted that an outlet surface 17p of the diverging hole portion 17 from a center portion to both end sides in a lateral direction L3 gradually to a great extent leans toward a downstream side of the hot gas on the basis of a hypothetical plane VP parallel to two directions of an axial center direction L2 and a lateral direction L3 of the straight hole portion 15.

1 Claim, 12 Drawing Sheets

TURBINE COMPONENT

TECHNICAL FIELD

The present invention relates to a turbine component such as a turbine airfoil and a turbine shroud applied to a gas turbine engine of an aircraft engine or such, and in particular relates to a film cooling hole in the turbine component.

BACKGROUND ART

A brief description on a prior turbine airfoil and a film cooling hole in the prior turbine airfoil will be given hereinafter with reference to FIG. 13 and FIG. 14.

Figure 13:
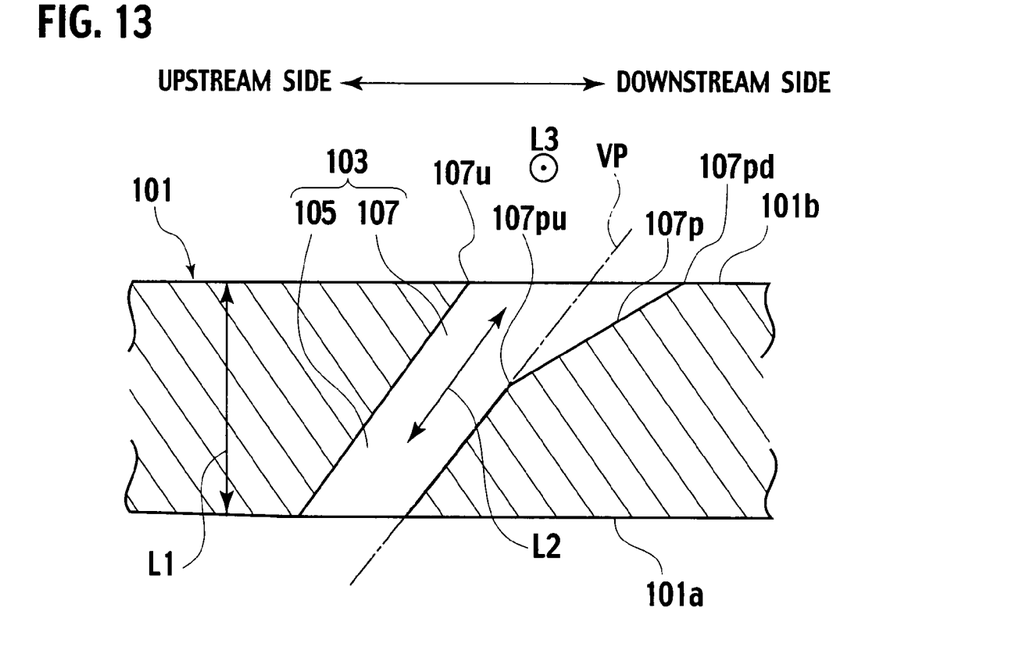
FIG. 13 is a cross sectional view of a film cooling hole in a prior cooling turbine airfoil.
Figure 14:
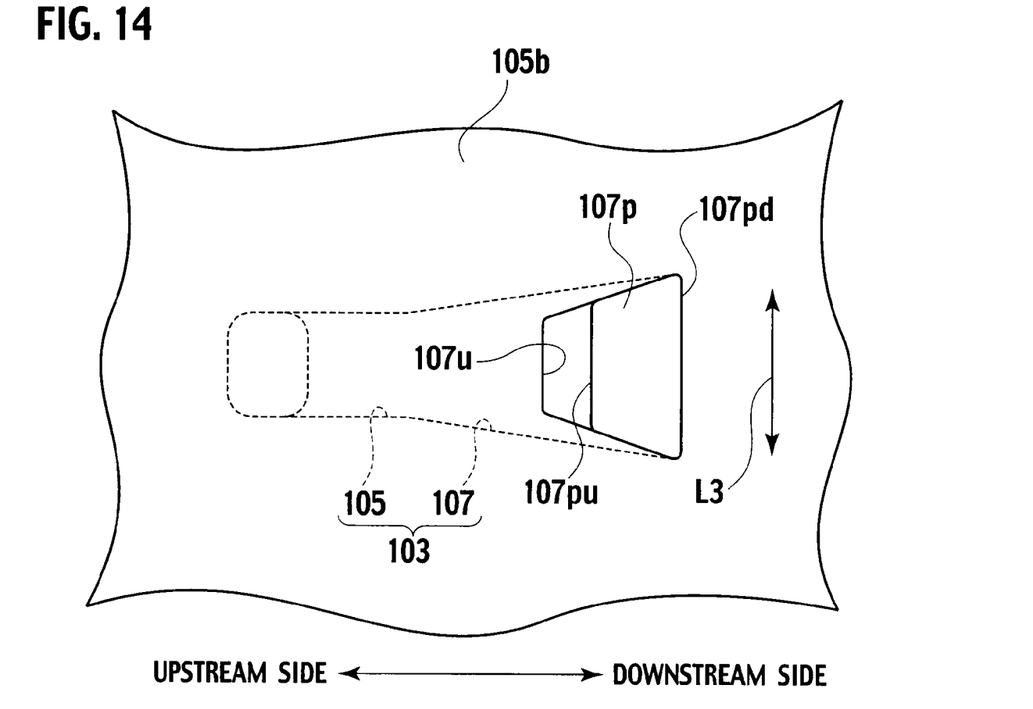
FIG. 14 is a schematic drawing in that FIG. 13 is viewed from the top.
Figure 15:
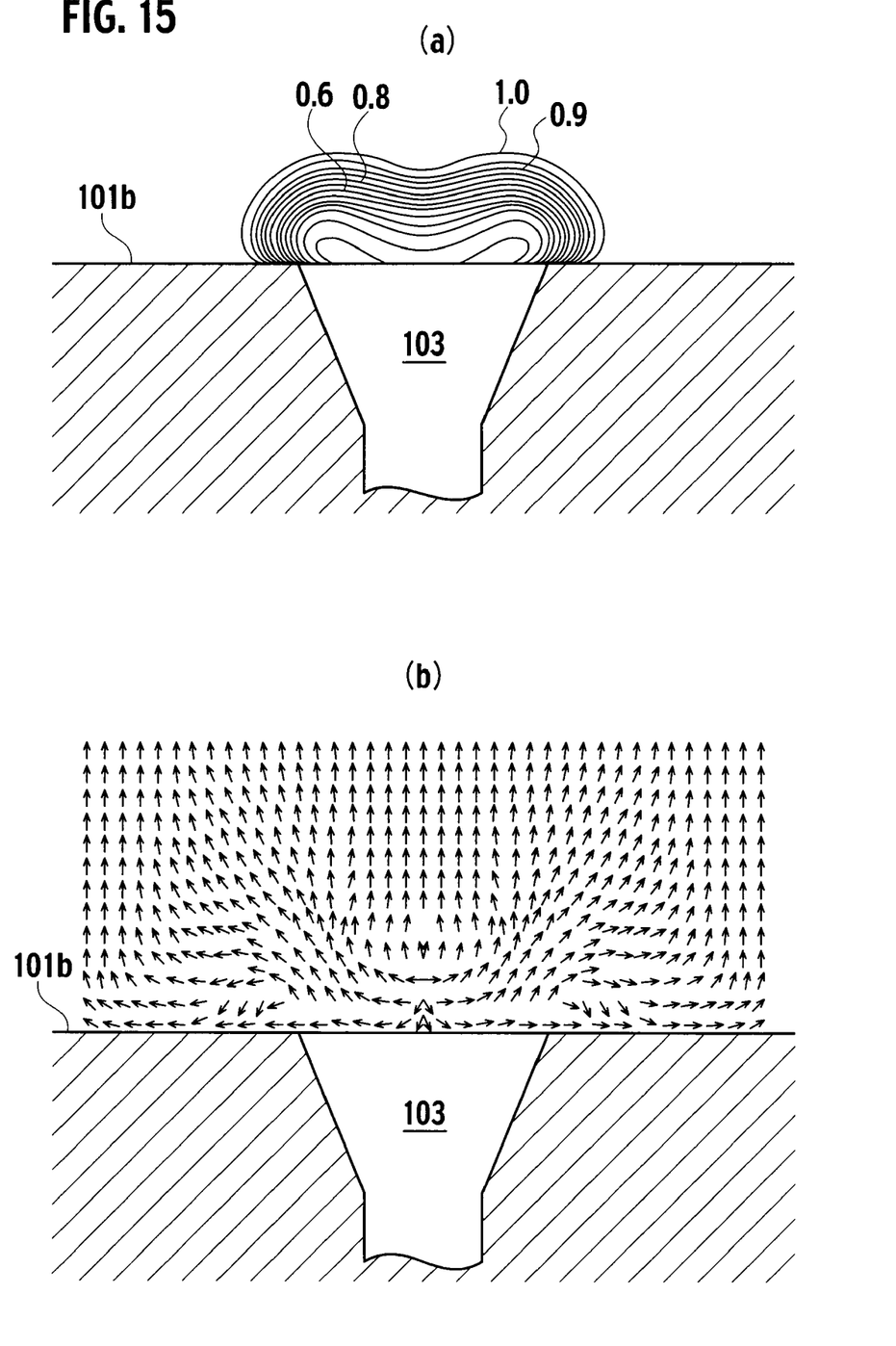
FIG. 15(a) is a drawing showing a result of a CFD analysis about temperature around an exit of the film cooling hole in the prior cooling turbine airfoil.
FIG. 15(b) is a drawing showing a result of a CFD analysis about flow of cooling air of the film cooling hole in the prior cooling turbine airfoil.

As shown in FIG. 13 and FIG. 14, the prior turbine airfoil is applied to a gas turbine engine of an aircraft engine or such and is comprised of a turbine airfoil main body 101 (shown only in part). Further, in portions (an airfoil for example) exposed to hot gas in the turbine airfoil main body 101, a plurality of film cooling holes 103 of a so-called shaped type, which expels cooling air CA, which is introduced from a side of an inner wall surface 101a of the turbine airfoil main body 101, along an outer wall surface 101b of the turbine airfoil main body 101, are formed by electric spark machining.

Further, a concrete constitution of the respective film cooling holes 103 is as follows.

More specifically, at a portion at the side of the inner wall surface 101a of the turbine airfoil main body 101, a straight hole portion 105 is formed and the straight hole portion 105 is so constituted that a cross section thereof is substantially uniform in shape along a thickness direction L1 of the turbine airfoil main body 101. Further, at a portion at the side of the outer wall surface 105b of the turbine airfoil main body 103, a diverging hole portion 107 continuous to the straight hole portion 105 is formed and the diverging hole portion 107 is so constituted as that a cross section thereof gradually broadens toward the side of the outer wall surface 101b of the turbine airfoil main body 101 and has an outlet surface 107p at a downstream side of the hot gas (the downstream side in view of a flow direction of the hot gas, at the right in FIG. 13 and FIG. 14). Further, each of the respective film cooling holes 103 is so constituted that the outlet surface 107p of the diverging hole portion 107 leans toward the downstream side of the hot gas on the basis of a hypothetical plane VP parallel to two directions of an axial center direction L2 and a lateral direction L3 of the straight hole portion 105.

In the meantime, an upstream end 107pu of the outlet surface 107p is disposed at a downstream side relative to an upstream end 107u of the diverging hole portion 107 at an aperture side, and a downstream end 107pd of the outlet surface 107p forms a downstream end of the diverging hole portion 107 at the aperture side.

Therefore, when the cooling air CA is introduced from the side of the inner wall surface 101a of the turbine airfoil main body 101 to the plurality of film cooling holes 103 under operation of the gas turbine engine, it expels cooling air CA along the outer wall surface 101b of the turbine airfoil main body 101 by means of the plurality of film cooling holes 103. Thereby, a film of the cooling air covering a wide range of the outer wall surface 101b of the turbine airfoil main body 101 can be generated and the turbine airfoil can be served with film cooling.

DISCLOSURE OF INVENTION

By the way, there is a film effectiveness as one indicating an effectiveness of film cooling of the turbine airfoil, and a considerable extent of a flow rate of cooling air CA is required to increase the film effectiveness of the turbine airfoil. On the other hand, if the flow rate of the cooling air CA increases to make a flow speed of the cooling air CA greater, separation of the cooling air CA at the outer wall of the turbine airfoil main body 101 occurs. Therefore, there is a problem in that the film effectiveness of the turbine airfoil cannot be sufficiently increased.

A first feature of the present invention is that, in a turbine component used in a gas turbine engine, a turbine component main body and a plurality of film cooling holes formed at regions exposed to a hot gas in the turbine component main body, the film cooling holes expel cooling air, which is introduced from a side of an inner wall surface of the turbine component main body, along an outer wall surface of the turbine component main body, is provided, and each of the film cooling holes is comprised of a straight hole portion formed in a portion of the turbine component at the side of the inner wall surface so constituted that a cross section of the straight hole portion is substantially uniform in shape along a thickness direction of the turbine airfoil main body, and a diverging hole portion continuous to the straight hole portion so constituted that a cross section of the diverging hole portion gradually broadens toward the side of the outer wall surface, the diverging hole portion having an outlet surface at a downstream side of the hot gas, wherein each of the film cooling holes is so constituted that the outlet surface of the diverging hole portion from a center portion to both end sides gradually to a great extent leans toward the downstream side of the hot gas on the basis of a hypothetical plane parallel to two directions of an axial center direction and a lateral direction of the straight hole portion.

Here, in the turbine component, a turbine airfoil, a turbine shroud and such are included.

A second feature of the present invention is that, in a turbine component used in a gas turbine engine, a turbine component main body and a plurality of film cooling holes formed at regions exposed to a hot gas in the turbine component main body, the film cooling holes expel cooling air, which is introduced from a side of an inner wall surface of the turbine component main body, along an outer wall surface of the turbine component main body, is provided, and each of the film cooling holes is comprised of a straight hole portion formed in a portion of the turbine component at the side of the inner wall surface so constituted that a cross section of the straight hole portion is substantially uniform in shape along a thickness direction of the turbine airfoil main body, and a diverging hole portion continuous to the straight hole portion so constituted that a cross section of the diverging hole portion gradually broadens toward the side of the outer wall surface, the diverging hole portion having an outlet surface at a downstream side of the hot gas, wherein each of the film cooling holes is so constituted that the outlet surface of the diverging hole portion leans toward an upstream side of the hot gas on the basis of a hypothetical plane parallel to two directions of an axial center direction and a lateral direction of the straight hole portion.

Here, in the turbine component, a turbine airfoil, a turbine shroud and such are included.

BEST MODE FOR CARRYING OUT THE INVENTION

First Embodiment

A first embodiment will be described with reference to FIG. 1 through FIG. 6 and FIG. 15.

Figure 1:
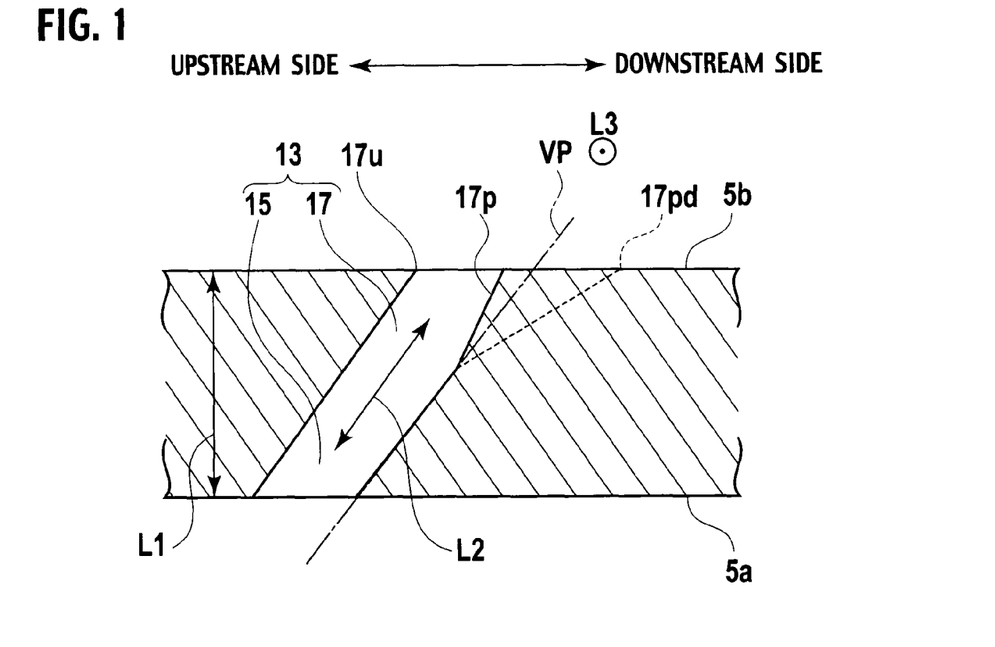
FIG. 1 is a cross sectional view of a film cooling hole in a cooling turbine airfoil in accordance with a first embodiment.
Figure 2:
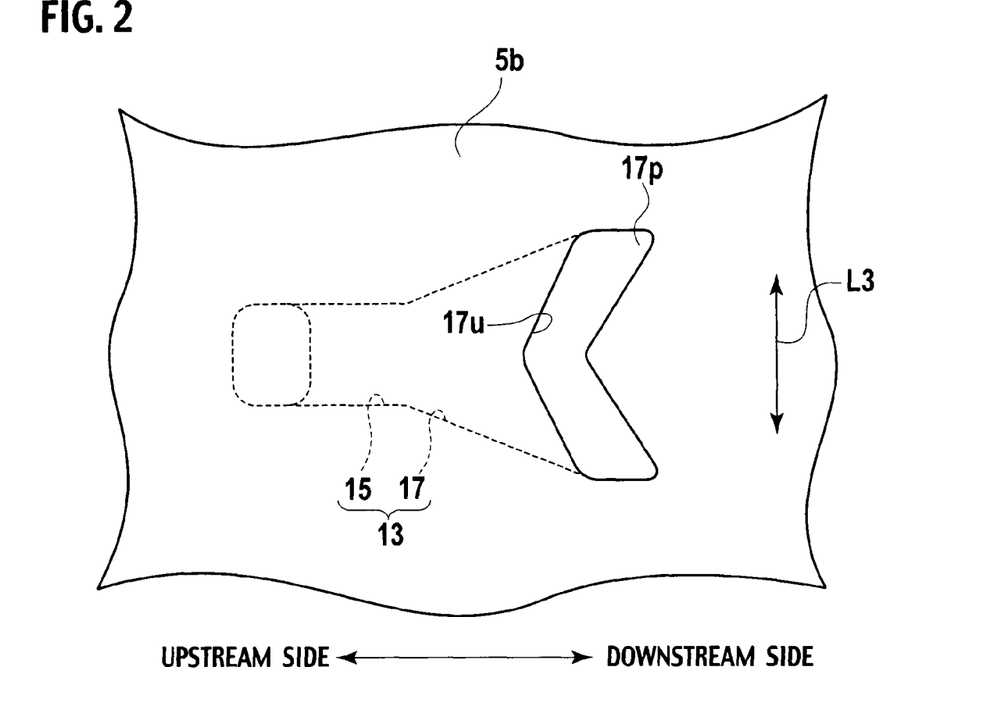
FIG. 2 is a schematic drawing in that FIG. 1 is viewed from the top.
Figure 3:
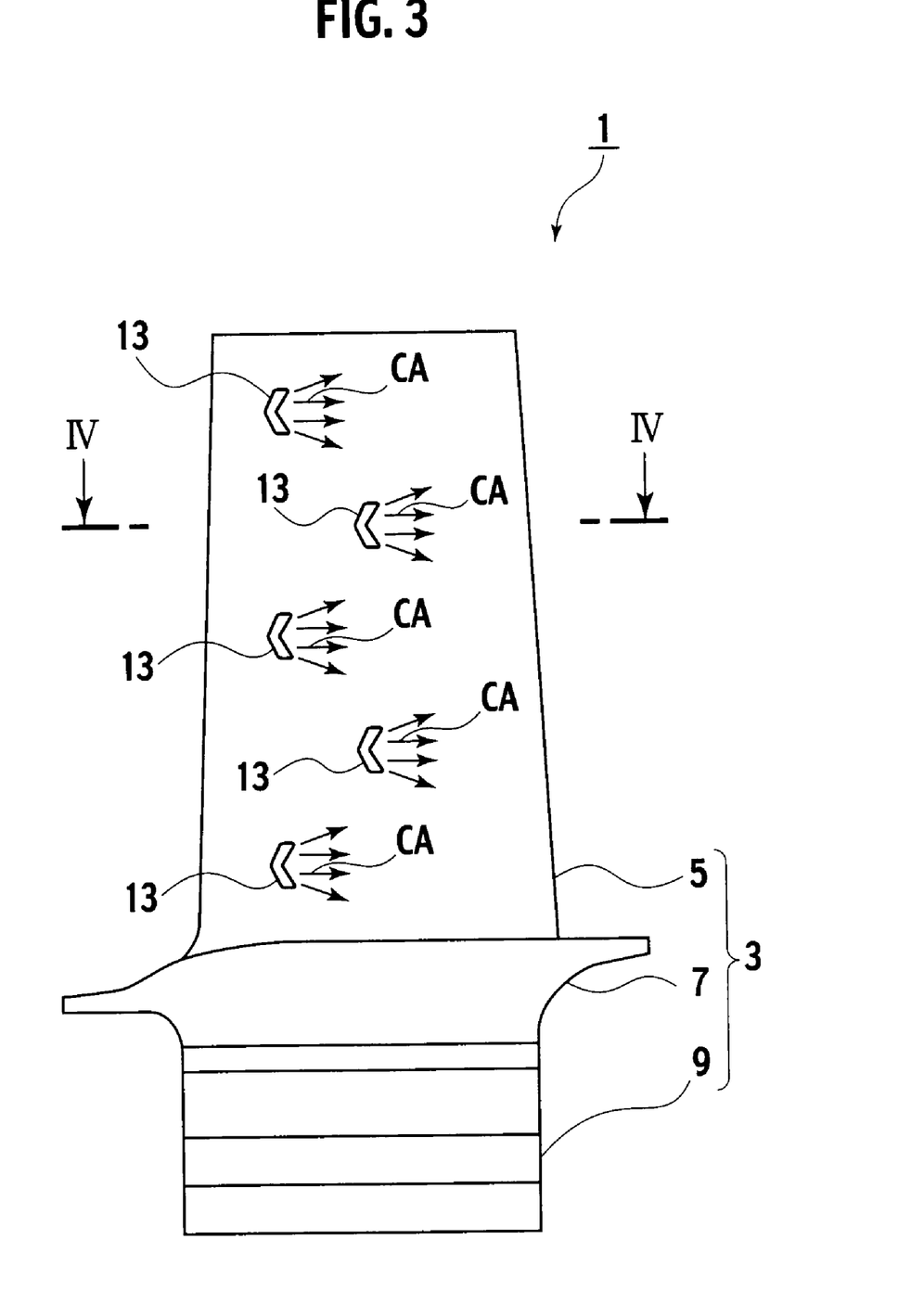
FIG. 3 is a drawing showing a cooling turbine airfoil in accordance with the first embodiment.
Figure 4:
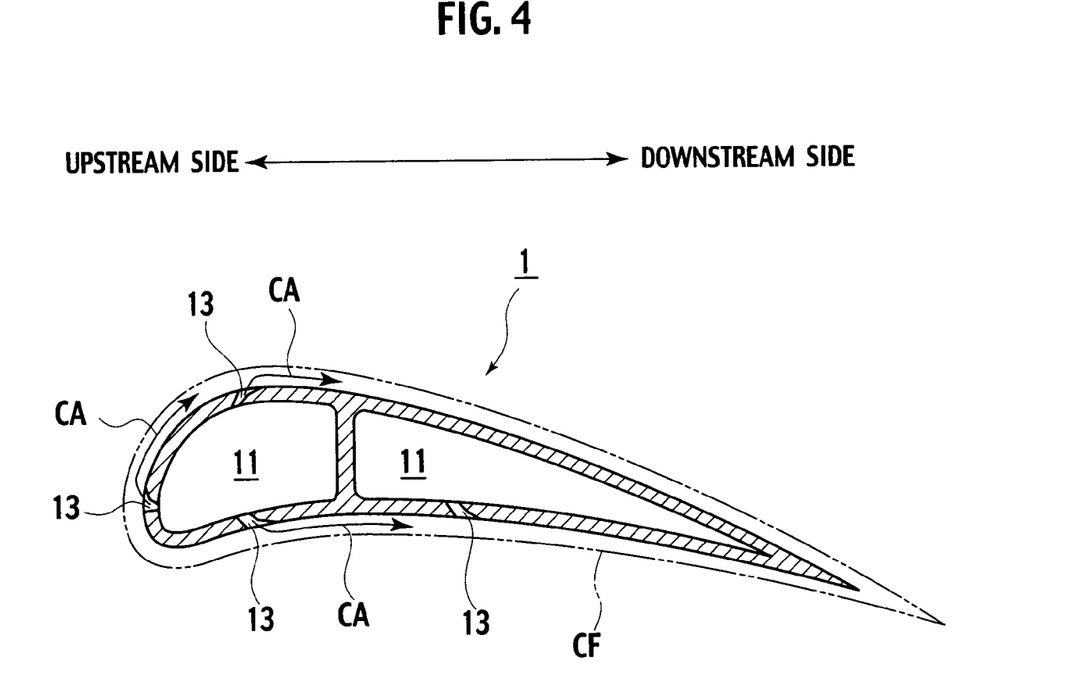
FIG. 4 is a drawing taken along a line IV-IV of FIG. 3.
Figure 5:
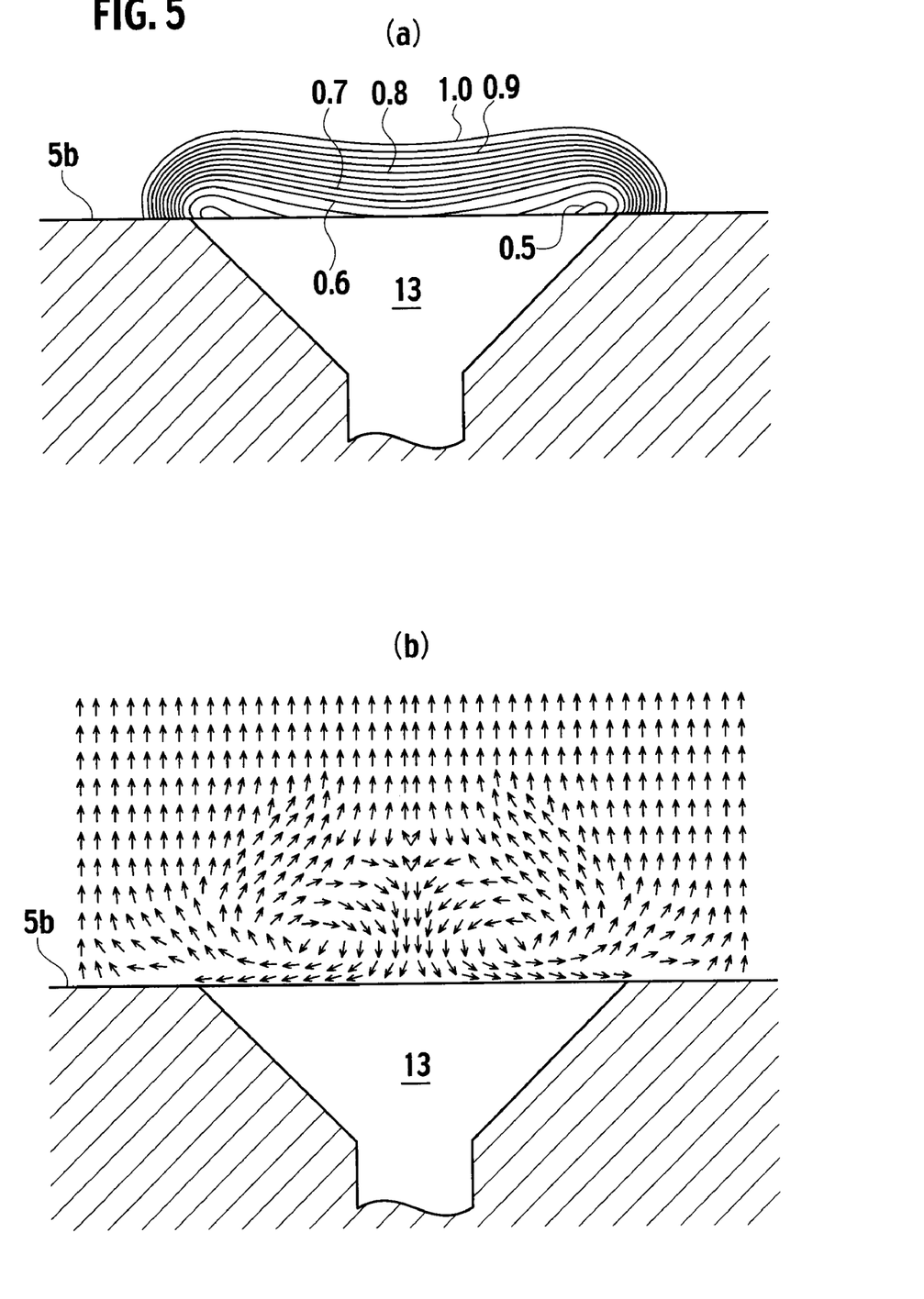
FIG. 5(a) is a drawing showing a result of a CFD analysis about temperature around an exit of the film cooling hole in the cooling turbine airfoil in accordance with the first embodiment.
FIG. 5(b) is a drawing showing a result of a CFD analysis about flow of cooling air of the film cooling hole in the cooling turbine airfoil in accordance with the first embodiment.
Figure 6:
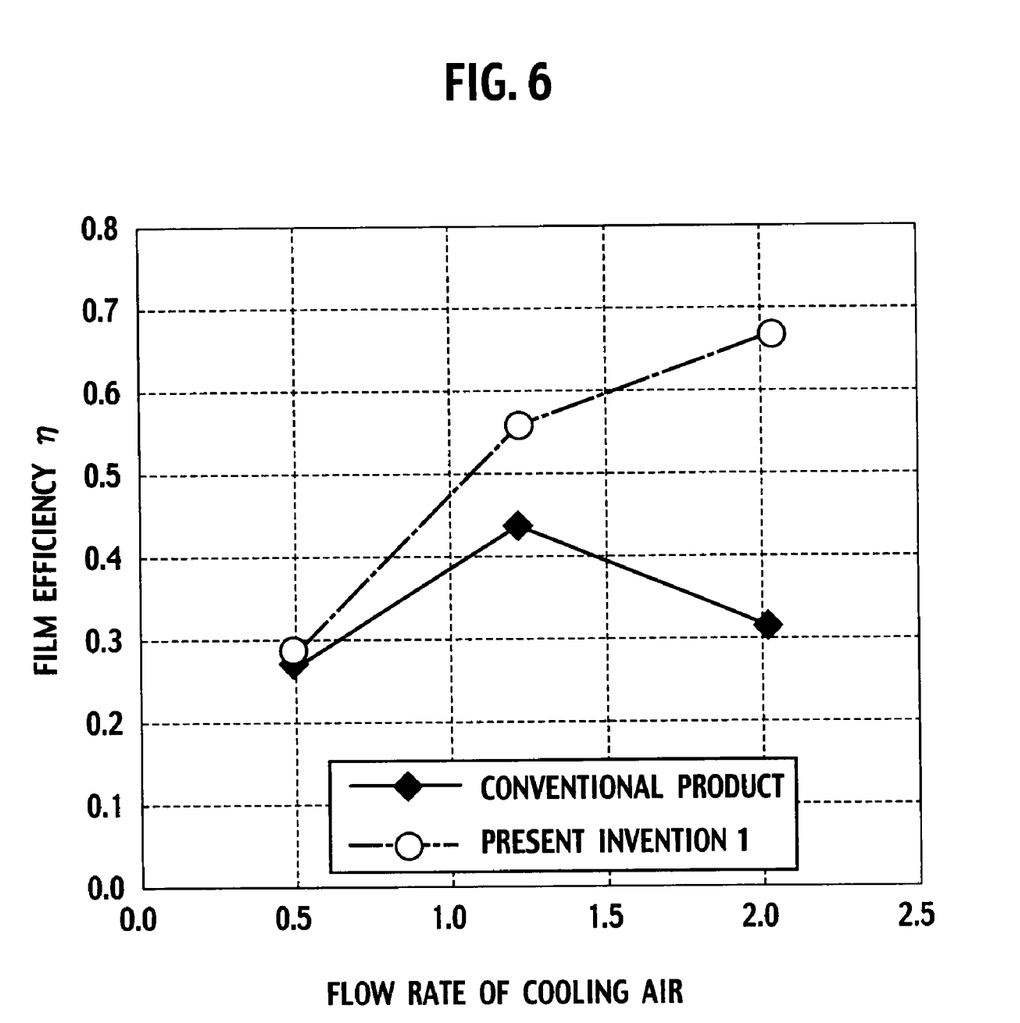
FIG. 6 is a drawing showing a relation between a flow rate of cooling air and film efficiencies of an invented product 1 and a conventional product.

Here, FIG. 1 is a cross sectional view of a film cooling hole in a cooling turbine airfoil in accordance with a first embodiment, FIG. 2 is a schematic drawing in that FIG. 1 is viewed from the top, FIG. 3 is a drawing showing a cooling turbine airfoil in accordance with the first embodiment, FIG. 4 is a drawing taken along a line IV-IV of FIG. 3, FIG. 5(a) is a drawing showing a result of a CFD analysis about temperature around an exit of the film cooling hole in the cooling turbine airfoil in accordance with the first embodiment, FIG. 5(b) is a drawing showing a result of a CFD analysis about flow of cooling air of the film cooling hole in the cooling turbine airfoil in accordance with the first embodiment, FIG. 6 is a drawing showing a relation between a flow rate of cooling air and film efficiencies of an invented product 1 and a conventional product, FIG. 15(a) is a drawing showing a result of a CFD analysis about temperature around an exit of the film cooling hole in the prior cooling turbine airfoil, and FIG. 15(b) is a drawing showing a result of a CFD analysis about flow of cooling air of the film cooling hole in the prior cooling turbine airfoil.

As shown in FIG. 3 and FIG. 4, a turbine airfoil 1 in accordance with the first embodiment is a component of a turbine (not shown) in a gas turbine engine of an aircraft engine or such, and is capable of film cooling.

The turbine airfoil 1 is comprised of a turbine airfoil main body 3 as a component main body, and this turbine airfoil main body 3 is composed of an airfoil 5 obtaining rotational force by a hot gas from a combustor (not shown) in the gas turbine engine, a platform 7 integrally provided at a proximal end side of the airfoil 5, and a dovetail 9 integrally provided at a proximal end side of the platform 7 and engageable with a dovetail slot (not shown) of a turbine disk (not shown) of the turbine. Further, the turbine airfoil main body 3 has coolant passages 11 in its interior, into which a part of compressed air extracted from a compressor (not shown) or a fan (not shown) in the gas turbine engine is capable of flowing as cooling air CA.

A plurality of film cooling holes 13, each of which expels the cooling air CA introduced from a side of an inner wall surface 5a of the airfoil 5 in the turbine airfoil main body 3 along an outer wall surface 5b of the airfoil 5 in the turbine airfoil main body 3, is formed in the airfoil 5 (at regions exposed to the hot gas) in the turbine airfoil main body 3, and a constitution of each of the film cooling holes 13 is as follows.

More specifically, as shown in FIG. 1 and FIG. 2, at a portion at a side of the inner wall surface 5a of the airfoil 5 in the turbine airfoil main body 3, a straight hole portion 15 communicating with the coolant passages 11 is formed, and the straight hole portion 15 is so constituted that a cross section thereof is substantially uniform in shape along a thickness direction L1 of the airfoil 5 in the turbine airfoil main body 3. Further, at a portion at a side of the outer wall surface 5b of the airfoil 5 in the turbine airfoil main body 3, a diverging hole portion 17 continuous to the straight hole portion 15 is formed, and the diverging hole portion 17 is so constituted that a cross section thereof gradually broadens toward the side of the outer wall surface 5b of the airfoil 5 in the turbine airfoil main body 3 and has an outlet surface 17p at a downstream side of the hot gas (a downstream side in view from a direction of flow of the hot gas, and a right side in FIG. 1 and FIG. 2).

Further, each of the film cooling holes 13 is so constituted that the outlet surface 17p of the diverging hole portion 17 from a center portion to both end sides gradually to a great extent leans toward the downstream side of the hot gas and the outlet surface 17p of the diverging hole portion 17 leans toward an upstream side of the hot gas at a center in the lateral direction on the basis of a hypothetical plane VP parallel to two directions of an axial center direction L2 and a lateral direction L3 of the straight hole portion 15. Here, while each of the film cooling holes 13 is so constituted that the outlet surface 17p of the diverging hole portion 17 leans toward the upstream side of the hot gas at the center in the lateral direction on the basis of the hypothetical plane VP as described above, the film cooling holes 13 may be so constituted that the outlet surface 17p of the diverging hole portion 17, at the center portion of the lateral direction L3, leans toward the downstream side of the hot gas or the outlet surface 17p of the diverging hole portion 17, at the center portion of the lateral direction L3, is substantially parallel to the hypothetical plane VP.

Next, functions and effects of the first embodiment will be described.

When a part of compressed air extracted from the compressor or the fan, as the cooling air CA, flows into the coolant passages 11 and is introduced from the side of the inner wall surface 5a of the airfoil 5 in the turbine airfoil main body 3 under operation of the gas turbine engine, it expels the cooling air CA along the outer wall surface 5b of the airfoil 5 in the turbine airfoil main body 3 by means of the plurality of film cooling holes 13. Thereby, a film of the cooling air CA covering a wide range of the outer wall surface 5b of the airfoil 5 in the turbine airfoil main body 3 can be generated and the turbine airfoil 1 can be served with film cooling (a cooling function of the turbine airfoil 1).

Here, aside from the cooling function of the turbine airfoil 1, as each of the film cooling holes 13 is so constituted that the outlet surface 17p of the diverging hole portion 17 from the center portion to both end sides gradually to a great extent leans toward the downstream side of the hot gas and the outlet surface 17p of the diverging hole portion 17 leans toward the upstream side of the hot gas at the center in the lateral direction on the basis of the hypothetical plane VP, the film cooling hole 13 can be broadened in the lateral direction L3 as compared with the film cooling hole 103 in the prior turbine component under a condition that an aperture area of the diverging hole portion 17 is made identical to an aperture area of the diverging hole portion 107 of the film cooling hole 103 (see FIG. 14). Thereby, as being supported by results of CFD analyses shown in FIG. 5(a) and FIG. 15(a), diffusion of the cooling air CA in the lateral direction L3 at the outer wall surface 5b of the airfoil 5 in the turbine airfoil main body 3 can be promoted as compared with the prior turbine airfoil. In the meantime, nondimensionalization is carried out with respect to temperatures in FIG. 5(a) and FIG. 15(a).

Further, on the same ground, as being supported by a result of a CFD analysis shown in FIG. 5(b), a pair of vortexes of the cooling air CA which are in a reverse relation (a relation in which directions of the vortexes are opposite) in the vicinity of the outer wall surface 5b of the turbine airfoil main body 3 can be generated. Thereby, separation of the cooling air CA at the outer wall surface 5b of the airfoil 5 in the turbine airfoil main body 3 can be suppressed. In the meantime, in accordance with a result of a CFD analysis shown in FIG. 15(b), vortexes of the cooling air CA in the vicinity of the outer wall surface 101b of the turbine airfoil main body 101 are not generated.

In accordance with the aforementioned first embodiment, because the diffusion of the cooling air CA in the lateral direction L3 at the outer wall surface 5b of the airfoil 5 in the turbine airfoil main body 3 can be promoted and also separation of the cooling air CA at the outer wall surface 5b of the airfoil 5 in the turbine airfoil main body 3 can be suppressed, the film effectiveness η of the turbine airfoil 1 of the cooling air CA can be sufficiently increased as compared with the prior turbine airfoil as shown in FIG. 6.

Here, in FIG. 6, a product of the turbine airfoil 1 embodied in accordance with the first embodiment is referred to as an invented product 1, and an embodied product of the prior turbine airfoil is referred to as a conventional product. Further, a film effectiveness η is defined by a film effectiveness η=(Tg−Tf)/(Tg−Tc) supposed that a temperature of the hot gas is Tf, a temperature of a cooling film CF is Tf, and a temperature of the cooling air CA is Tc.

Second Embodiment

A second embodiment will be described with reference to FIG. 7 through FIG. 12 and FIG. 15.

Figure 7:
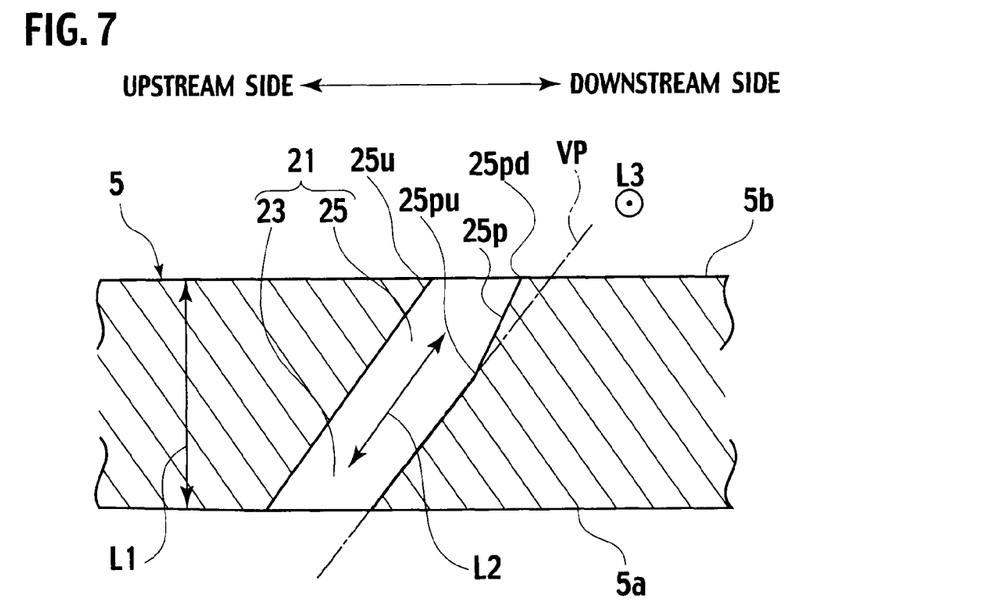
FIG. 7 is a cross sectional view of a film cooling hole in a cooling turbine airfoil in accordance with a second embodiment.
Figure 8:
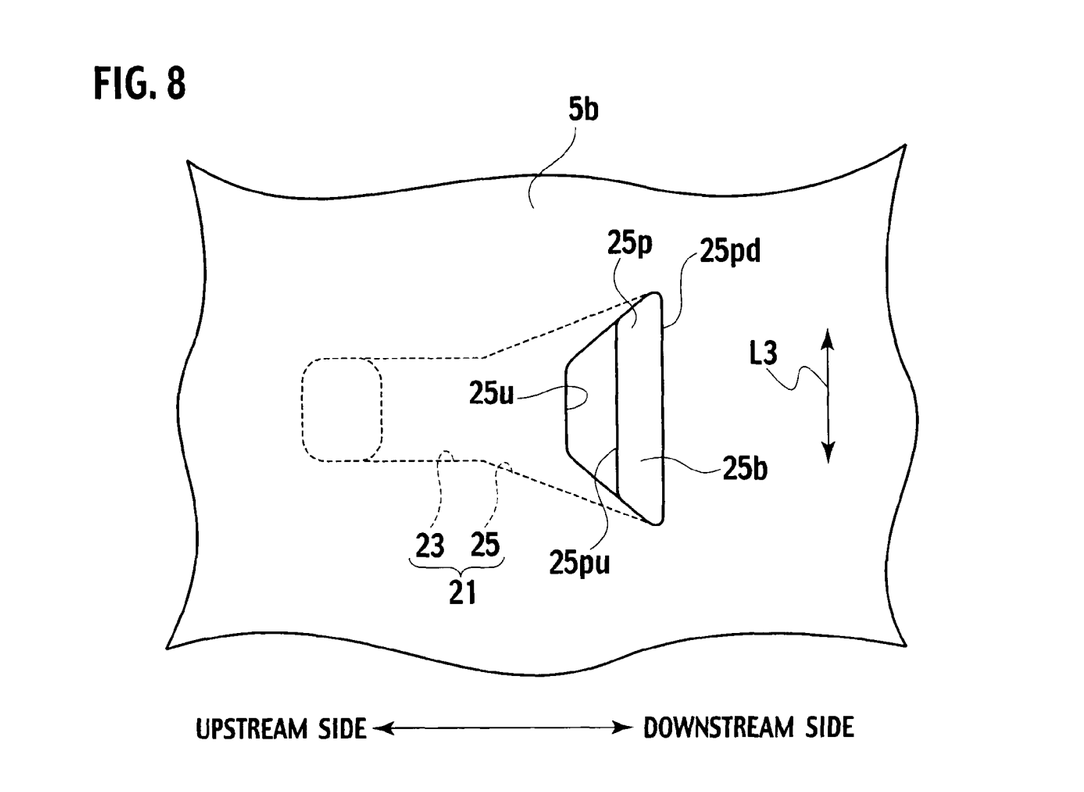
FIG. 8 is a schematic drawing in that FIG. 7 is viewed from the top.
Figure 9:
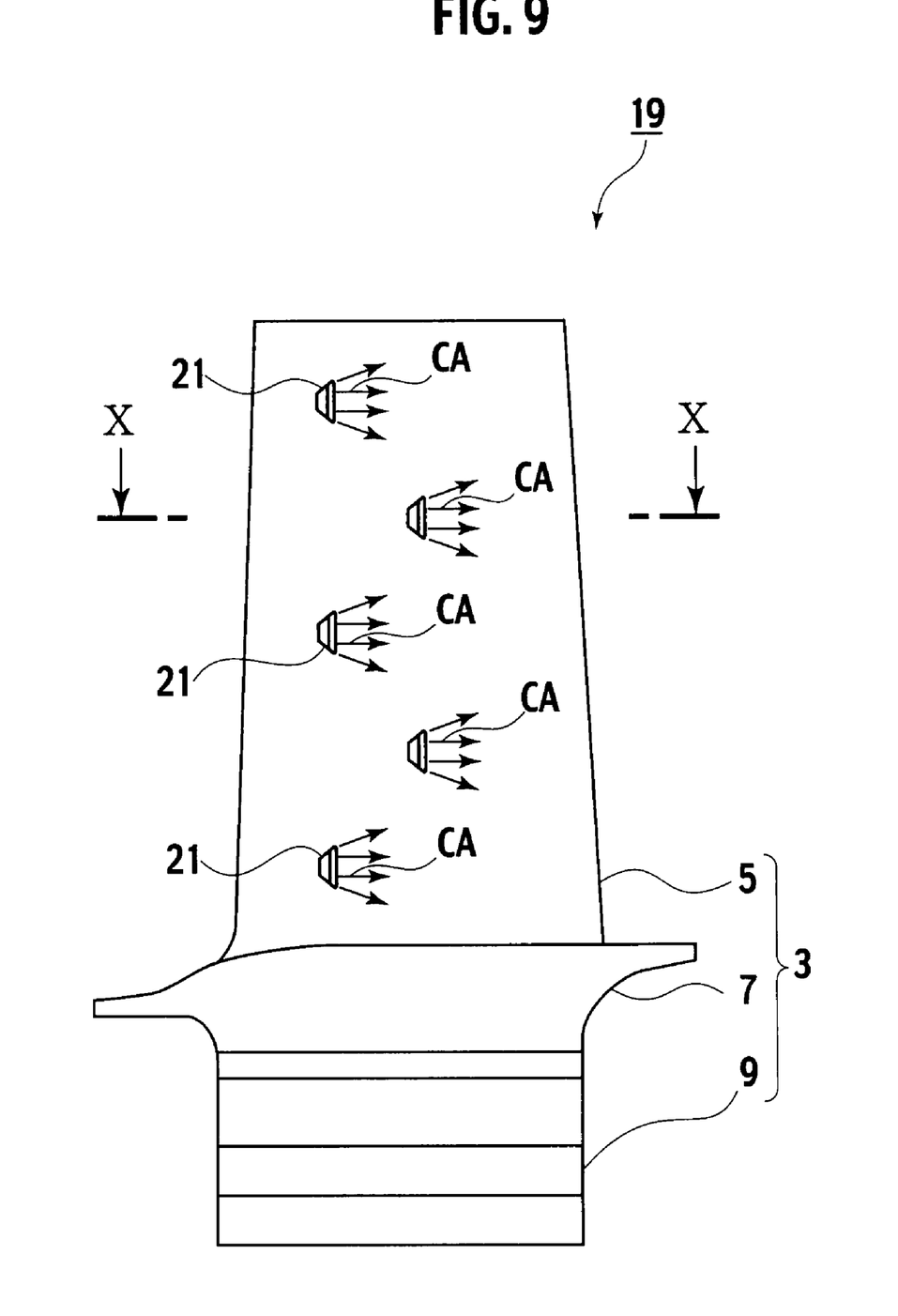
FIG. 9 is a drawing showing a cooling turbine airfoil in accordance with the second embodiment.
Figure 10:
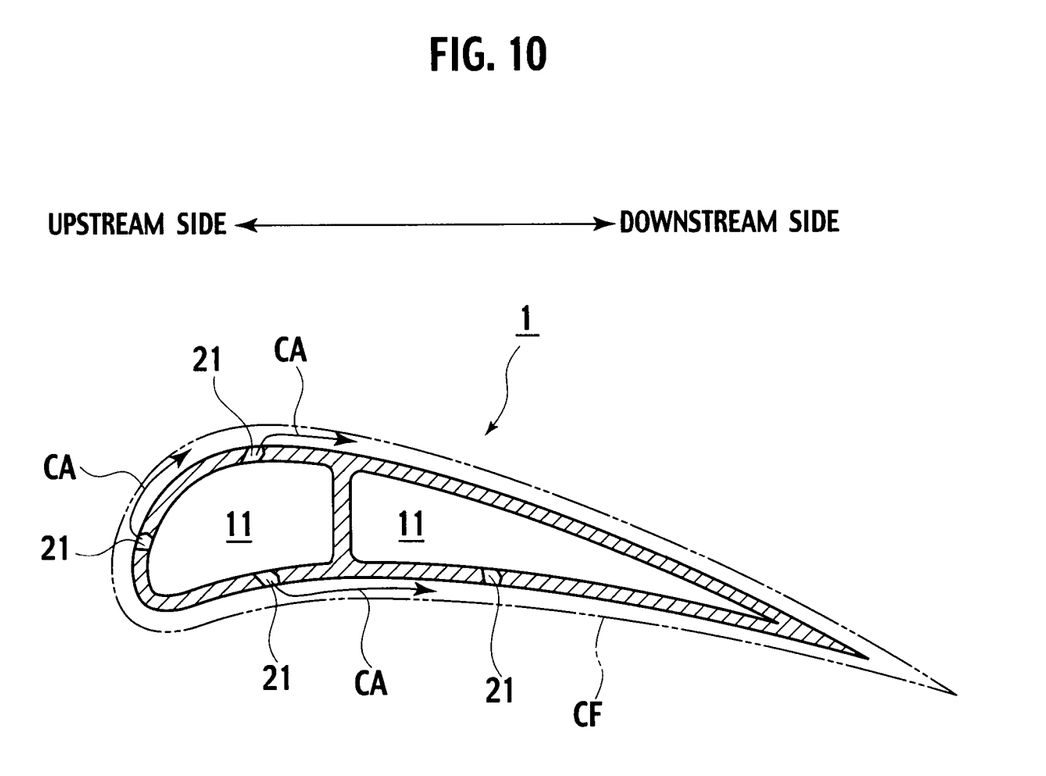
FIG. 10 is a drawing taken along a line X-X of FIG. 9.
Figure 11:
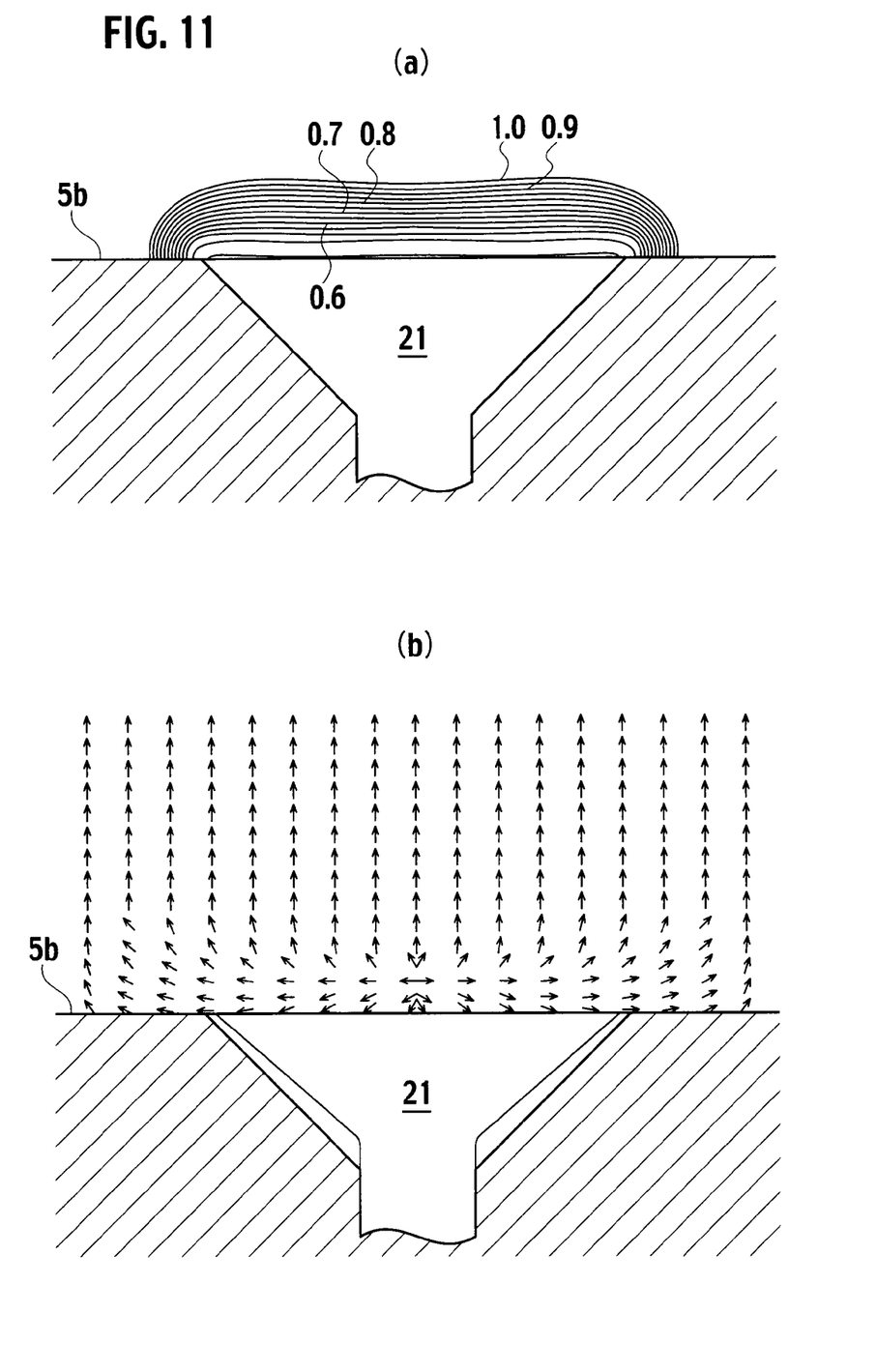
FIG. 11(a) is a drawing showing a result of a CFD analysis about temperature around an exit of the film cooling hole in the cooling turbine airfoil in accordance with the second embodiment.
FIG. 11(b) is a drawing showing a result of a CFD analysis about flow of cooling air of the film cooling hole in the cooling turbine airfoil in accordance with the second embodiment.
Figure 12:
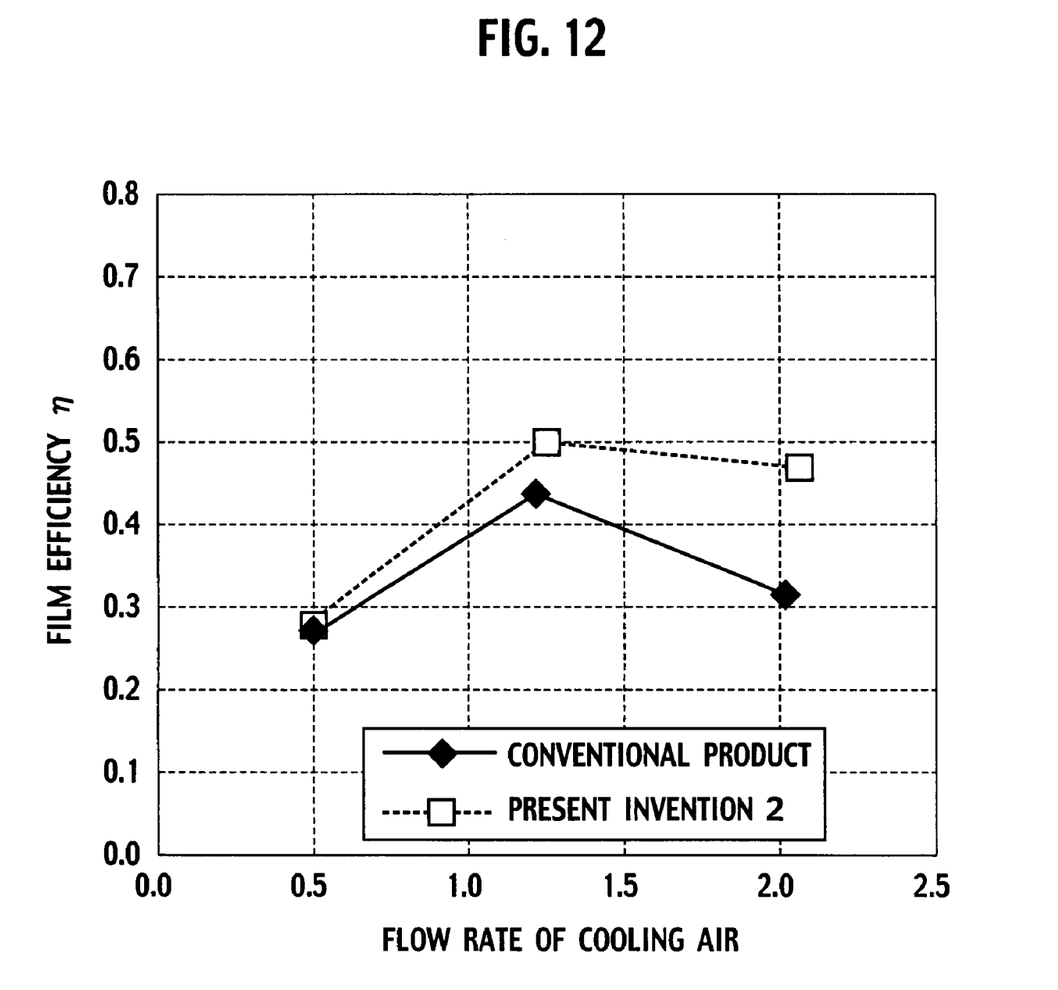
FIG. 12 is a drawing showing a relation between a flow rate of cooling air and film efficiencies of an invented product 1 and a conventional product.

Here, FIG. 7 is a cross sectional view of a film cooling hole in a cooling turbine airfoil in accordance with a second embodiment, FIG. 8 is a schematic drawing in that FIG. 7 is viewed from the top, FIG. 9 is a drawing showing a cooling turbine airfoil in accordance with the second embodiment, FIG. 10 is a drawing taken along a line X-X of FIG. 9, FIG. 11(a) is a drawing showing a result of a CFD analysis about temperature around an exit of the film cooling hole in the cooling turbine airfoil in accordance with the second embodiment, FIG. 11(b) is a drawing showing a result of a CFD analysis about flow of cooling air of the film cooling hole in the cooling turbine airfoil in accordance with the second embodiment, and FIG. 12 is a drawing showing a relation between a flow rate of cooling air and film efficiencies of an invented product 1 and a conventional product.

As shown in FIG. 9 and FIG. 10, a turbine airfoil 19 in accordance with the second embodiment is, as with the turbine airfoil 1 in accordance with the first embodiment, comprised of a turbine airfoil main body 3 composed of an airfoil 5, a platform 7 and a dovetail 9, and the turbine airfoil main body 3 has coolant passages 11 in its interior.

A plurality of film cooling holes 21, each of which expels the cooling air CA introduced from a side of an inner wall surface 5a of the airfoil 5 in the turbine airfoil main body 3 along an outer wall surface 5b of the airfoil 5 in the turbine airfoil main body 3, is formed in the airfoil 5 (at regions exposed to the hot gas) in the turbine airfoil main body 3, and a constitution of each of the film cooling holes 21 is as follows.

More specifically, as shown in FIG. 7 and FIG. 8, at a portion at a side of the inner wall surface 5a of the airfoil 5 in the turbine airfoil main body 3, a straight hole portion 23 communicating with the coolant passages 11 is formed, and the straight hole portion 23 is so constituted that a cross section thereof is substantially uniform in shape along a thickness direction L1 of the airfoil 5 in the turbine airfoil main body 3. Further, at a portion at a side of the outer wall surface 5b of the airfoil 5 in the turbine airfoil main body 3, a diverging hole portion 25 continuous to the straight hole portion 23 is formed, and the diverging hole portion 25 is so constituted that cross section thereof gradually broaden toward the side of the outer wall surface 5b of the airfoil 5 in the turbine airfoil main body 3 and has an outlet surface 25p at a downstream side of the hot gas (a downstream side in view from a direction of flow of the hot gas, and a right side in FIG. 7 and FIG. 8).

Further, each of the film cooling holes 21 is so constituted that the outlet surface 25p of the diverging hole portion 25 leans toward the upstream side of the hot gas (the left side in FIG. 7 and FIG. 8) on the basis of a hypothetical plane VP parallel to two directions of an axial center direction L2 and a lateral direction L3 of the straight hole portion 23.

In the meantime, an upstream end 25pu of the outlet surface 25p is disposed at a downstream side relative to an upstream end 25u of the diverging hole portion 25 at an aperture side, and a downstream end 27pd of the outlet surface 25p forms a downstream end of the diverging hole portion 25 at the aperture side.

Next, functions and effects of the second embodiment will be described.

When a part of compressed air extracted from the compressor or the fan, as the cooling air CA, flows into the coolant passages 11 and is introduced from the side of the inner wall surface 5a of the airfoil 5 in the turbine airfoil main body 3 under operation of the gas turbine engine, it expels the cooling air CA along the outer wall surface 5b of the airfoil 5 in the turbine airfoil main body 3 by means of the plurality of film cooling holes 21. Thereby, a film of the cooling air CA covering a wide range of the outer wall surface 5b of the airfoil 5 in the turbine airfoil main body 3 can be generated and the turbine airfoil 19 can be served with film cooling (a cooling function of the turbine airfoil 19).

Here, aside from the cooling function of the turbine airfoil 19, as each of the film cooling holes 21 is so constituted that the outlet surface 25p of the diverging hole portion 25 leans toward the upstream side of the hot gas on the basis of the hypothetical plane VP parallel, the film cooling hole 21 can be broadened in the lateral direction L3 as compared with the film cooling hole 103 in the prior turbine component under a condition that an aperture area of the diverging hole portion 17 is made identical to an aperture area of the diverging hole portion 107 of the film cooling hole 103 (see FIG. 14). Thereby, as being supported by results of CFD analyses shown in FIG. 11(a) and FIG. 15(a), diffusion of the cooling air CA in the lateral direction L3 at the outer wall surface 5b of the airfoil 5 in the turbine airfoil main body 3 can be promoted as compared with the prior turbine airfoil. In the meantime, nondimensionalization is carried out with respect to temperatures in FIG. 11(a).

Further, on the same ground, as being supported by results of CFD analyses shown in FIG. 11(b) and FIG. 15(b), flows of the cooling air CA in the lateral direction in the vicinity of the outer wall surface 5b of the turbine airfoil main body 3 can be strengthened as compared with the prior turbine airfoil. Thereby, separation of the cooling air CA at the outer wall surface 5b of the airfoil 5 in the turbine airfoil main body 3 can be suppressed.

In accordance with the aforementioned second embodiment, because the diffusion of the cooling air CA in the lateral direction L3 at the outer wall surface 5b of the airfoil 5 in the turbine airfoil main body 3 can be promoted and also separation of the cooling air CA at the outer wall surface 5b of the airfoil 5 in the turbine airfoil main body 3 can be suppressed, the film effectiveness η of the turbine airfoil 19 of the cooling air CA can be sufficiently increased as compared with the prior turbine airfoil as shown in FIG. 12.

Here, in FIG. 12, a product of the turbine airfoil 1 embodied in accordance with the second embodiment is referred to as an invented product 2, and an embodied product of the prior turbine airfoil is referred to as a conventional product.

In the meantime, the present invention is not limited to the descriptions of the aforementioned embodiments, and can be embodied into various modes by carrying out any proper modifications such as applying the constitutions of the film cooling holes 13, 21 applied to the turbine airfoils 1, 19 as-is to any other turbine components such as a shroud as follows. Further, the scope of the right involved in the present invention is not limited to these embodiments.

The invention claimed is:

1. A turbine component used in a gas turbine engine, the turbine component comprising:
   a turbine component main body; and
   a plurality of film cooling holes formed at regions exposed to a hot gas in the turbine component main body, the film cooling holes expel cooling air, which is introduced from a side of an inner wall surface of the turbine component main body, along an outer wall surface of the turbine component main body, each of the film cooling holes comprising:
   a straight hole portion formed in a portion of the turbine component at the side of the inner wall surface so constituted that a cross section of the straight hole portion is substantially uniform in shape along a thickness direction of the turbine component main body, and
   a diverging hole portion continuous to the straight hole portion so constituted that a cross section of the diverging hole portion gradually broadens toward the side of the outer wall surface, the diverging hole portion having an outlet surface at a downstream side of the hot gas, wherein
   each of the film cooling holes is so constituted that the outlet surface of the diverging hole portion from a center portion to both end sides gradually leans toward the downstream side of the hot gas on the basis of a hypothetical plane parallel to two directions of an axial center direction and a lateral direction of the straight hole portion, and
   each of the film cooling holes is so constituted that the outlet surface of the diverging hole portion leans toward an upstream side of the hot gas at a center in the lateral direction on the basis of the hypothetical plane.

* * * * *